(12) United States Patent
Chen

(10) Patent No.: US 12,022,918 B2
(45) Date of Patent: Jul. 2, 2024

(54) FASTENER TAPE, SLIDE FASTENER, SKIN PRODUCT, AND METHOD OF FORMING FASTENER TAPE

(71) Applicant: KEE (HUBEI) ZIPPERS MANUFACTURING LIMITED, Jingmen (CN)

(72) Inventor: Changhua Chen, Foshan (CN)

(73) Assignee: KEE (HUBEI) ZIPPERS MANUFACTURING LIMITED, Jingmen (CN)

(*) Notice: Subject to any disclaimer, the term of this patent is extended or adjusted under 35 U.S.C. 154(b) by 92 days.

(21) Appl. No.: 17/925,020

(22) PCT Filed: Aug. 10, 2021

(86) PCT No.: PCT/CN2021/111787
§ 371 (c)(1),
(2) Date: Nov. 14, 2022

(87) PCT Pub. No.: WO2022/057523
PCT Pub. Date: Mar. 24, 2022

(65) Prior Publication Data
US 2023/0172323 A1    Jun. 8, 2023

(30) Foreign Application Priority Data

Sep. 18, 2020 (CN) .......................... 202010988754.8
Sep. 18, 2020 (CN) .......................... 202010990375.2

(51) Int. Cl.
*A44B 19/34* (2006.01)
*B29C 65/72* (2006.01)
*B29C 65/62* (2006.01)

(52) U.S. Cl.
CPC .............. *A44B 19/34* (2013.01); *B29C 65/62* (2013.01); *B29C 65/72* (2013.01)

(58) Field of Classification Search
CPC ....... A44B 19/34; A44B 19/40; A44B 19/406; A44B 19/52; B29C 65/62; B29C 65/72;
(Continued)

(56) References Cited

U.S. PATENT DOCUMENTS 3,484,906 A * 12/1969 Yoshida Tadao .... A44B 19/406
                                                    24/395
3,594,874 A *  7/1971 Fujisaki ............... A44B 19/406
                                                    24/396
(Continued)

FOREIGN PATENT DOCUMENTS

CN     102481040 A    5/2012
CN     108056539 A    5/2018
(Continued)

*Primary Examiner* — Robert Sandy
(74) *Attorney, Agent, or Firm* — Bayramoglu Law Offices LLC

(57) ABSTRACT

A fastener tape, a slide fastener, a skin product, and a method of forming the fastener tape are provided. The method includes forming fabric tapes made from high-melting warp yarns and weft yarns. The fabric tapes each include an outer connecting portion and an inner connecting portion. Fastener teeth are sewn to an outer side of the inner connecting portion through a sewing thread. The inner connecting portion includes an teeth sewing region. A low-melting component is provided in at least the teeth sewing region, and the low-melting component thermally welds the high-melting sewing thread, warp yarns, and weft yarns to form a hardened structure. The method further includes heating, after the fastener teeth are sewn to the fabric tapes, the fabric tapes for bending and shaping, such that the low-melting component thermally welds the sewing thread, the warp yarns, and the weft yarns.

20 Claims, 3 Drawing Sheets

(58) Field of Classification Search
CPC ............. Y10T 24/2529; Y10T 24/2527; Y10T 24/2523; Y10T 24/2521; Y10T 24/252; Y10T 24/2518
See application file for complete search history.

(56) References Cited

U.S. PATENT DOCUMENTS

| | | | | |
|---|---|---|---|---|
| 3,885,273 | A * | 5/1975 | Heimberger | A44B 19/40 24/401 |
| 6,427,294 | B1 * | 8/2002 | Shibaike | A44B 19/34 24/381 |
| 8,739,372 | B2 * | 6/2014 | Hasegawa | A44B 19/08 24/392 |
| 9,089,187 | B2 * | 7/2015 | Takano | A44B 19/346 |
| 2005/0188907 | A1 | 9/2005 | D'Henin | |
| 2016/0037872 | A1 | 2/2016 | Smith | |

FOREIGN PATENT DOCUMENTS

| | | |
|---|---|---|
| CN | 207678962 U | 8/2018 |
| CN | 110545689 A | 12/2019 |
| CN | 111096525 A | 5/2020 |
| CN | 111642865 A | 9/2020 |
| CN | 112075728 A | 12/2020 |
| CN | 112107086 A | 12/2020 |
| EP | 0111788 A2 | 6/1984 |
| EP | 1048237 A1 | 11/2000 |
| EP | 2476333 A1 | 7/2012 |
| JP | 514826 | 2/1976 |
| JP | 2011006817 A | 1/2011 |
| WO | 2018163357 A1 | 9/2018 |

\* cited by examiner

FASTENER TAPE, SLIDE FASTENER, SKIN PRODUCT, AND METHOD OF FORMING FASTENER TAPE

CROSS REFERENCE TO THE RELATED APPLICATIONS

This application is the national phase entry of International Application No. PCT/CN2021/111787, filed on Aug. 10, 2021, which is based upon and claims priority to Chinese Patent Applications No. 202010990375.2 and No. 202010988754.8, both filed on Sep. 18, 2020, the entire contents of which are incorporated herein by reference.

TECHNICAL FIELD

The present disclosure relates to a fastener tape, a slide fastener, a skin product, and a method of forming the fastener tape. Specifically, the present disclosure relates to a concealed slide fastener, which is provided with a fastener tape, including two fabric tapes arranged on the left and right and fastener teeth sewn to the inner sides of the fabric tapes. When the fastener teeth are engaged, even if the fabric tapes are pulled hard (with a large pulling force in a left-right direction), it is hard to make the fastener teeth clearly exposed from the front side of the fastener tape, thereby concealing the fastener teeth.

BACKGROUND

There are many types of concealed slide fasteners on the market. Generally, the fastener teeth are sewn to the inner sides of the left and right fabric tapes of the concealed slide fastener. If the fabric tapes are pulled hard in the left-right direction, the sewing thread sewing the fastener teeth of the slide fastener will slip relative to the warp yarns and weft yarns. As a result, there will be an obvious gap between the left and right fabric tapes, which will directly expose the fastener teeth concealed from behind. concealed slide fasteners used in furniture seats, car seats, or decorative panels are expected to reduce the gap viewed from the front side of the slide fastener to reduce the exposure of the fastener teeth and ensure a good appearance.

The solutions to the above problem were first disclosed in the Japanese Patent Application Showa 51-4826 filed in 1976 and the Chinese Patent Application 200980161353.7 filed in 2012. The Japanese Patent Application Showa 51-4826 discloses a concealed slide fastener. The concealed slide fastener has woven fabric tapes. The fabric tapes each have a body portion, an teeth sewing portion for sewing fastener teeth, and a bent portion. A hardened portion hardened by impregnating with a synthetic resin liquid is provided in a partial region of the teeth sewing portion and the bent portion on a side of the teeth sewing portion. The fastener teeth are sewn to the hardened portion with a sewing thread. When the fastener teeth on the left and right are engaged, the bent portions in the left and right fabric tapes are stably maintained in close contact with each other, thereby preventing the formation of a gap between the left and right bent portions. In this way, the left and right fastener teeth in the engaged state are stably concealed without being seen from an exposed side of the concealed slide fastener. The biggest problem with this design is that when the fastener teeth are sewed to the teeth sewing portion, it is difficult for a sewing needle of a sewing machine to pass through the teeth sewing portion (hardened portion). Thus, the sewing of the fastener teeth cannot be performed smoothly, the sewing needle is easily broken, and the sewing thread can move relative to the hardened portion.

In addition, in the Japanese Patent Application Showa 51-4826, in a modified solution of the concealed slide fastener, a partial region of the fabric tape is hardened by fastening a synthetic resin film body to a surface of the partial region (outer surface of the fabric tape), instead of hardening the partial region of the fabric tape by impregnating with the synthetic resin liquid. As a result, the partial region of the fabric tape is hardened by fastening the synthetic resin film body to the partial region of the fabric tape. In this way, by fastening the film body, when the left and right fastener elements are engaged, the bent portions of the left and right fabric tapes can also be stably maintained in close contact with each other to make the fastener elements stably concealed. However, in the way the element mounting portion is hardened by fastening the film body the concealed slide fastener also has the aforementioned disadvantages. Moreover, when the film body is fastened to the fabric tape, the film body is easily displaced. Furthermore, if the film body is displaced with respect to the fabric tape, the intended position of the fabric tape cannot be stably hardened, thereby reducing the concealability of the concealed slide fastener.

To solve the problems existing in the Japanese Patent Application Showa 51-4826, YKK Corporation of Japan proposed a concealed slide fastener in the Chinese Patent Application 200980161353.7. The teeth sewing portion of the concealed slide fastener has a tubular bag fabric portion made of a continuous tubular bag fabric in which a film body is wrapped. The tubular bag fabric portion includes a top stitch passing region through which a top sewing thread at a side of the bent portion is passed. When one end edge of the film body wrapped in the tubular bag fabric portion is provided closer than the top sewing thread to the side of the bent portion, the top sewing thread is sewn together with the fastener teeth. Since the film body is wrapped and fixed by the tubular bag fabric portion, the film body has difficulty moving in the tubular bag fabric portion and the needle hole protrusion is not exposed. However, when the film body and the tubular bag fabric portion are subjected to the pulling force of the sewing thread sewing the fastener teeth in the left-right direction, since the tubular bag fabric portion itself is not tight, it will also be stretched to create a large gap. In addition, since the film body has a relatively large hardness, when the sewing thread is sewn, the sewing of the fastener teeth cannot be performed smoothly, the sewing needle is easily broken, and the sewing thread can move relative to the film body to increase the gap.

To solve the problems existing in the technical solution of the Chinese Patent Application 200980161353.7, Chinese Patent Application 201721282792.1 proposes a fabric tape for a slide fastener. The fabric tape uses the film body as sheet-like warp yarns of a fastener teeth connecting portion. The hardness of the sheet-like warp yarns is greater than that of other surrounding warp yarns and weft yarns. The sheet-like warp yarns are woven with the weft yarns to form at least a part of the fastener teeth connecting portion. However, in this improved structure, when a pulling force is applied in the left-right direction, the warp yarns are easily stretched and displaced due to the loose fastener teeth connecting portion, resulting in that the sewing thread is easily moved to create a large gap.

SUMMARY

According to the contents disclosed in the prior art, when two fabric tapes of a concealed slide fastener are pulled hard in a left-right direction, a gap is likely to appear between the two fabric tapes to expose the fastener teeth. This problem is directly related to factors, such as the hardness of the fastener teeth connecting portion, a possible deformation of warp yarns due to a reversed left-right pulling force exerted by a sewing thread when the fabric tapes are pulled, and the slip of the sewing thread relative to the fastener teeth connecting portion. To solve most, if not all, of these problems, the present disclosure proposes a fastener tape. The fastener tape includes two fabric tapes, which extend in a longitudinal direction and are made by interweaving high-melting warp yarns and weft yarns in longitudinal and transverse directions. A cross-sectional view shows that the fabric tapes each include an outer connecting portion and an inner connecting portion, which are arranged left and right in the transverse direction and are connected by the weft yarns. The fastener tape further includes high-melting fastener teeth and sewing thread. The fastener teeth are sewn to an outer side of the inner connecting portion through the sewing thread. The outer connecting portion is used for connecting a fabric. The inner connecting portion includes an teeth sewing region bound with the sewing thread. A low-melting component is provided in at least the teeth sewing region of the inner connecting portion. The low-melting component thermally welds the sewing thread, the warp yarns, and the weft yarns, such that at least the teeth sewing region is formed into a hardened structure.

The warp yarns are yarns extending in the longitudinal direction in the fabric tape, and the weft yarns are yarns in a direction substantially perpendicular to the warp yarns. The fabric tape includes the warp yarns and the weft yarns interwoven in the longitudinal and transverse directions. The fabric tape may also be provided with a two-layer or three-layer fabric tape with a central pocket-shaped space constructed by a multi-layer fabrication process, which is easy to implement by an existing fabric tape fabrication process. The weft yarns extend from the outer connecting portion to the inner connecting portion. Therefore, the outer connecting portion and the inner connecting portion are mainly connected by the weft yarns, and the weft yarns bear the pulling force of pulling the fabric tape in the left-right direction. The melting temperature of the high-melting warp yarns, weft yarns, fastener teeth, and sewing thread is higher than that of the low-melting component. Therefore, the fastener tape includes at least the low-melting component and a high-melting component having a melting point higher than that of the low-melting component. In the present disclosure, the high-melting component and the low-melting component have different definitions. The high-melting component and the low-melting component are made from two parts or materials with different melting temperatures. The high-melting warp yarns, weft yarns, fastener teeth, and sewing thread are distinguished from the low-melting component based on melting temperature to facilitate the melting process. The high-melting component is not melted when heated at a low temperature, but the low-melting component is melted, thereby thermally welding the high-melting component. According to this characteristic, the present disclosure fabricates the fastener tape and the slide fastener and achieves the objective of the present disclosure.

The fabric tape is intended to further sew the fastener teeth to form the fastener tape, and the fastener teeth are connected to the outer side of the inner connecting portion by the sewing thread. Therefore, the inner connecting portion is provided with the teeth sewing region which is bound with the sewing thread and allows the sewing thread to pass there-through. When the low-melting component thermally welds the warp yarns and the weft yarns, it actually thermally welds the sewing thread to fasten the fastener teeth together.

Thermal welding includes two meanings. The first meaning is that the low-melting component is melted partially or completely when heated and forms a lump after cooling. The second meaning is that after being melted, the low-melting component will weld the surrounding unmelted high-melting warp yarns, weft yarns, and sewing thread. When the temperature is lowered, the melted low-melting component becomes hard, and the sewing thread, the warp yarns, and the weft yarns are fixedly connected by the low-melting component to form the hardened structure together. In this way, the warp yarns will not be displaced when they are pulled by the pulling force in the left-right direction, and the sewing thread is fixed in the hardened structure and will not be moved, thereby making the fastener teeth hard to move.

According to the meanings of thermal welding to achieve the objective of the present disclosure, the low-melting component may be in a granular shape, a short fiber shape, a long fiber shape, a long strip shape, or a strip of fabric (woven from the long strip or fiber). Furthermore, the low-melting component may be directly provided in the fabric tape, provided on the outer side of the fabric tape, added into the warp yarns, fabricated into low-temperature warp yarns, or mixed with that in the above solution. As a technical common sense, in actual slide fastener processing, for a slide fastener requiring dyeing, the melting temperature of the low-melting component should be higher than the dyeing temperature. In addition, the melting temperature should also be higher than the daily ambient temperature and the safe use temperature specified by relevant standards. The fabric tapes and fastener teeth of the existing concealed slide fastener are made from polymer materials, such as nylon and plastic. Generally, according to the melting temperatures of the polymer materials in the prior art, the suitable low-melting material can be flexibly selected to fabricate the low-melting component. For example, if the high-melting warp yarns, weft yarns, sewing thread, and fastener teeth are made from a polymer material with a melting point of about 260° C., the low-melting component in the fastener tape can be fabricated (formed) from a material, such as polyethylene (PE), polypropylene (PP), or polylaurylamide (PA12), which has a lower melting point. To facilitate the process control, the melting temperature difference between the low-melting component and the high-melting sewing thread, weft yarns, and warp yarns in the fabric tape is at least about 50° C.-90° C., that is, the melting temperature of the low-melting component is at least about 170° C.-210° C. The high-melting warp yarns, weft yarns, fastener teeth, and sewing thread in the fastener tape may also be made from different temperature grades or different types of high-melting materials.

In the above structural design, in terms of the region where the low-melting component is provided, the low-melting component may be provided in the entire inner connecting portion to thermally weld all adjacent warp yarns and weft yarns in the entire inner connecting portion. In addition, the low-melting component may also be provided only in the teeth sewing region of the inner connecting portion. The number of the low-melting components, the range of the distribution region of the low-melting components, etc., are related to the pulling force that the application object of the fastener tape needs to bear. For example, when the fastener tape is applied to a car seat with a high pulling force, the low-melting component needs to be as close to the bend transition as possible. When the fastener tape is applied to a garment with a low pulling force, the low-melting component may be provided in the teeth sewing region. In this way, in terms of the region where the low-melting component thermally welds the high-melting warp yarns, weft yarns, and sewing thread to form a hardened structure, the entire inner connecting portion may be set as a hardened structure, and only the teeth sewing region may be set as a hardened structure. Alternatively, the hardened structure may extend from the teeth sewing region to the junction of the inner connecting portion and the bend transition portion. These are all viable options.

According to the above technical solution, the low-melting component is thermally welded to the high-melting sewing thread, warp yarns, and weft yarns to form the hardened structure at least in the teeth sewing region. Compared with the prior art, the design of the present disclosure only requires setting the low-melting component based on the traditional fabric tape fabrication process and melting and lumping the low-melting component by heating to form the hardened structure. The process is simple and the hardened structure is stable and reliable. In addition, the hardened structure enables the warp yarns in the teeth sewing region to have the ability to resist the pulling force in the left-right direction. The hardened structure can reduce the left-right movement of the sewing thread relative to the teeth sewing region when the fabric tape is pulled in the left-right direction to reduce the gap between the two fabric tapes viewed from the front after the left and right fastener teeth are engaged. The final heat-setting process of the fabric tape can be combined with the process of heating and melting the low-melting component to form the hardened structure.

In a further technical solution, the outer connecting portion and the inner connecting portion are connected through a bend transition portion. The hardened structure starts and extends from the teeth sewing region to a junction between the inner connecting portion and the bend transition portion. Through this extension design, a stable gap for a bottom plate of the slider to pass through is formed between the bend transition portion and the fastener teeth, such that the slider can move up and down easily. In addition, the gap between the two fabric tapes viewed from the front is further reduced after the fastener teeth are engaged. The outer connecting portion and the inner connecting portion are connected through the bend transition portion, which not only defines that the outer connecting portion and the inner connecting portion are connected actually through the bend transition portion, but also defines that the outer connecting portion and the inner connecting portion have relative bending arrangement angles. Further, due to the relative bending arrangement angles, the fastener teeth can be sewn on one side of the inner connecting portion to form the hidden slide fastener. The bending process or the bent structure is generally implemented or formed when the slide fastener is finally heat-set.

In a further technical solution, the thickness of the inner connecting portion is greater than the thickness of the outer connecting portion. This design enhances the stiffness of the inner connecting portion, especially the hardened structure.

In a further technical solution, the low-melting component is a long strip, which is made from a low-melting material and is in the shape of yarn, a long wire, or a long sheet. Alternatively, the low-melting component is a long strip, which is made by mixing a low-melting material with a high-melting material and is in the shape of yarn, a long wire, or a long sheet. Alternatively, the low-melting component is a strip of fabric made of the long strip. That is, the long strip may be a yarn made from a filament by a spinning process, or may be a slender rod with a diameter of 1 mm or less or a long flake with a thickness of less than 1 mm formed by an extrusion process. The long strip may be a low-temperature yarn fully made from a low-melting material or may be a mixed yarn made by adding a low-melting material to a high-melting material. The strip of fabric may be an independent piece woven from the long strip as a warp yarn and a weft yarn or an independent piece woven from the long strip as a warp yarn and a high melting weft yarn.

In a further technical solution, a collection of all the warp yarns in the teeth sewing region is partially made of the long strip. That is, the long-strip low-melting component is mixed with the high-melting warp yarns to form the warp yarns of the fabric tape. As a part of the collection of all the warp yarns, the long strip is interwoven with the weft yarns, and a fabric layer including the low-melting component is directly formed in the teeth sewing region.

In a further technical solution, two layers of fabric tapes are at least provided in the teeth sewing region, a pocket-shaped space extending in the longitudinal direction is constructed between the two layers of fabric tapes, and the low-melting component is provided in the pocket-shaped space to thermally weld the two layers of fabric tapes. In this structure, the low-melting component may be provided in the pocket-shaped space while the pocket-shaped space is constructed. The low-melting component provided in the pocket-shaped space may be in a granular shape, a short fiber shape, a long fiber shape, a long strip shape, or a strip of fabric (woven from the long strip).

In a further technical solution, the low-melting component is provided on the outer side of the inner connecting portion. The low-melting component is pre-mounted on the outer side of the inner connecting portion by means of bonding or seaming, etc. When the low-melting component is melted, the surrounding weft yarns and warp yarns are thermally welded. In particular, when the low-melting component is a strip of fabric, the strip of fabric can easily be provided on the outer side of the inner connecting portion.

The present disclosure further proposes a slide fastener using the improved fastener tape. The slide fastener includes two fabric tapes and a slider, where the slider is bound with the fastener teeth provided on the two fabric tapes of the fastener tape, and the slider is configured to engage or separate two rows of the fastener teeth.

The present disclosure further proposes a skin product using the slide fastener. The skin product includes an outer layer made of a fabric, where the fabric is provided with a sewing portion shaped as an opening. The outer connecting portions of the two fabric tapes of the slide fastener are attached to two sides of the sewing portion, respectively, to link or open the sewing portion of the fabric by engaging or separating the fastener teeth. The fabric is made of textile, genuine leather, or artificial leather.

In a further technical solution, the skin product is a garment, a seat, a sofa, a mattress, or a decorative panel.

The present disclosure further proposes a method of forming a fastener tape, including forming two fabric tapes, which extend in a longitudinal direction, and are made by interweaving high-melting warp yarns and weft yarns in longitudinal and transverse directions. A cross-sectional view shows that the fabric tapes each include an outer connecting portion and an inner connecting portion, which are arranged left and right in the transverse direction and are connected by the weft yarns. The method further includes forming high-melting fastener teeth and sewing thread. The fastener teeth are sewn to an outer side of the inner connecting portion through the sewing thread. The outer connecting portion is used for connecting a fabric. The inner connecting portion includes an teeth sewing region bound with the sewing thread. A low-melting component is provided in at least the teeth sewing region of the inner connecting portion; the melting temperature of the low-melting component is lower than the melting temperature of the fastener teeth, the sewing thread, the weft yarns, and the warp yarns. After the warp yarns and the weft yarns of the fabric tapes are interwoven and the low-melting component is arranged, the fastener teeth are sewn through the sewing thread. The inner connecting portion is heated at a heating temperature adapted to the melting temperature of the low-melting component, such that the low-melting component is melted while the high-melting sewing thread, warp yarns, weft yarns, and fastener teeth are not melted. The low-melting component is cooled, such that the low-melting component is hardened and thermally welds the surrounding sewing thread, warp yarns, and weft yarns, thereby turning a region where the low-melting component is provided into a hardened structure.

The low-melting component is melted and hardened after cooling.

In a further improved solution, a collection of all the warp yarns of the inner connecting portion includes the low-melting component. The collection of all the warp yarns includes all the warp yarns of the inner connecting portion. That is, the low-temperature warp yarn made from a low-melting material, or the above-mentioned warp yarn for fabricating the fabric tape with the low-melting long strip added thereto may be added to the inner connecting portion. In this way, at least part of the warp yarns and weft yarns belong to a high-melting component, and the other part of the warp yarns belong to a low-melting component to prevent the fabric tape from losing radial strength. The low-temperature warp yarns in the collection of all the warp yarns can be melted to weld the sewing thread and other high-melting warp yarns and weft yarns to form a hardened structure.

The above solution has the following beneficial technical effects. First, for the low-melting component, when the inner connecting portion is heated at a heating temperature adapted to the melting temperature of the low-melting component, the low-melting component is melted to weld the surrounding high-melting sewing thread, warp yarns, and weft yarns. The shape of the low-melting component after heating and cooling does not change substantially, which makes it possible to form the hardened structure and maintain the connecting force of the inner connecting portion. Second, the low-melting component is added based on the existing fabrication process. The process is simple, and the hardened structure is stable and reliable. In addition, the final heat-setting process of the fabric tape and the process of heating and melting the low-melting component to form a hardened structure can be combined into one, without the need the set the heating process separately.

In a further technical solution, the diameter of the warp yarns of the inner connecting portion or the number of interwoven layers of the warp yarns and the weft yarns of the inner connecting portion is increased, such that the thickness of the inner connecting portion is greater than the thickness of the outer connecting portion.

In a further technical solution, the method further includes bending the fabric tapes along a side of the fastener teeth and pre-shaping by low-temperature heating, after the fastener teeth are sewn to the fabric tapes, to form the inner connecting portion and the outer connecting portion which have relative bending arrangement angles, and a bend transition portion that connects the outer connecting portion and the inner connecting portion; and heating the inner connecting portion at the heating temperature adapted to the melting temperature of the low-melting component to melt the low-melting component. After the slide fastener is cooled, the slider is provided on the fastener teeth of the two fabric tapes. The slider is bound to the two rows of the fastener teeth and is configured to engage or separate the two rows of the fastener teeth. The low temperature refers to a heating temperature lower than the melting temperature of the low-melting component, at which the pre-shaping and bending of the fabric tape are performed.

The method of forming according to the present disclosure has the above features and advantages and can apply to the fastener tape, the slide fastener, and the skin product.

DETAILED DESCRIPTION OF THE EMBODIMENTS

The structures and forming methods of a fastener tape, a slide fastener, and a skin product according to the technical solutions of the present disclosure are described in further detail below with reference to the drawings. The various embodiments disclosed below may be selectively applied or combined in one embodiment, even if they are not directly related or synergistic in function unless explicitly stated to be equivalent or alternative implementations.

Figure 1:
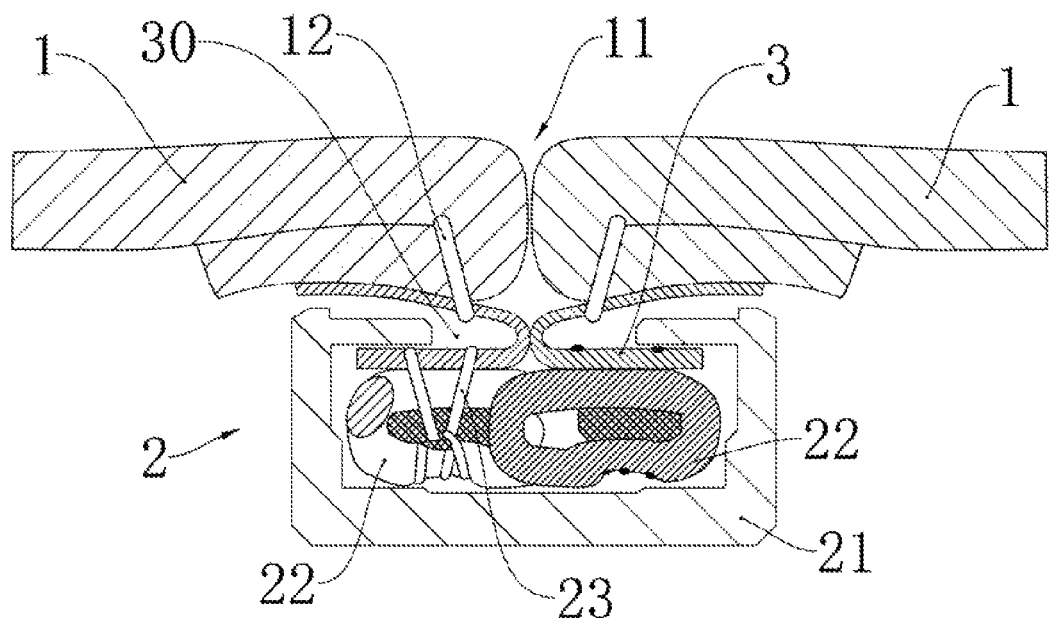
FIG. 1 is a structural diagram of a fabric of a skin product with a slide fastener according to a technical solution of the present disclosure.

As shown in FIG. 1, the present disclosure proposes a skin product including an outer layer made of a fabric 1. The fabric 1 is made of textile, genuine leather, or artificial leather. The skin product is a garment, a seat, a sofa, a mattress, or a decorative panel that needs invisible processing. The fabric 1 is provided with a sewing portion 11 shaped as an opening. Two fabric tapes 3 of a slide fastener 2 are sewn to two sides of the sewing portion 11 to link or open the sewing portion 11 of the fabric 1. The slide fastener 2 includes a fastener tape and a slider 21. The fastener tape includes the two fabric tapes 3, fastener teeth 22 sewn to the fabric tapes 3, and a sewing thread 23 for sewing the fastener teeth 22. The fastener teeth 22 and the sewing thread 23 are made from high-melting materials, such as high-temperature nylon. The fabric tape 3 is elongated and extends in a longitudinal direction. The fastener teeth 22 extend in the longitudinal direction and are arranged at a side position of each of the fabric tapes 3. After the two fabric tapes 3 of the concealed slide fastener 2 are connected to the two sides of the sewing portion 11, the two sides of the sewing portion 11 pull the two fabric tapes 3 in opposite directions, resulting in a larger gap between the two fabric tapes 3.

Figure 5:
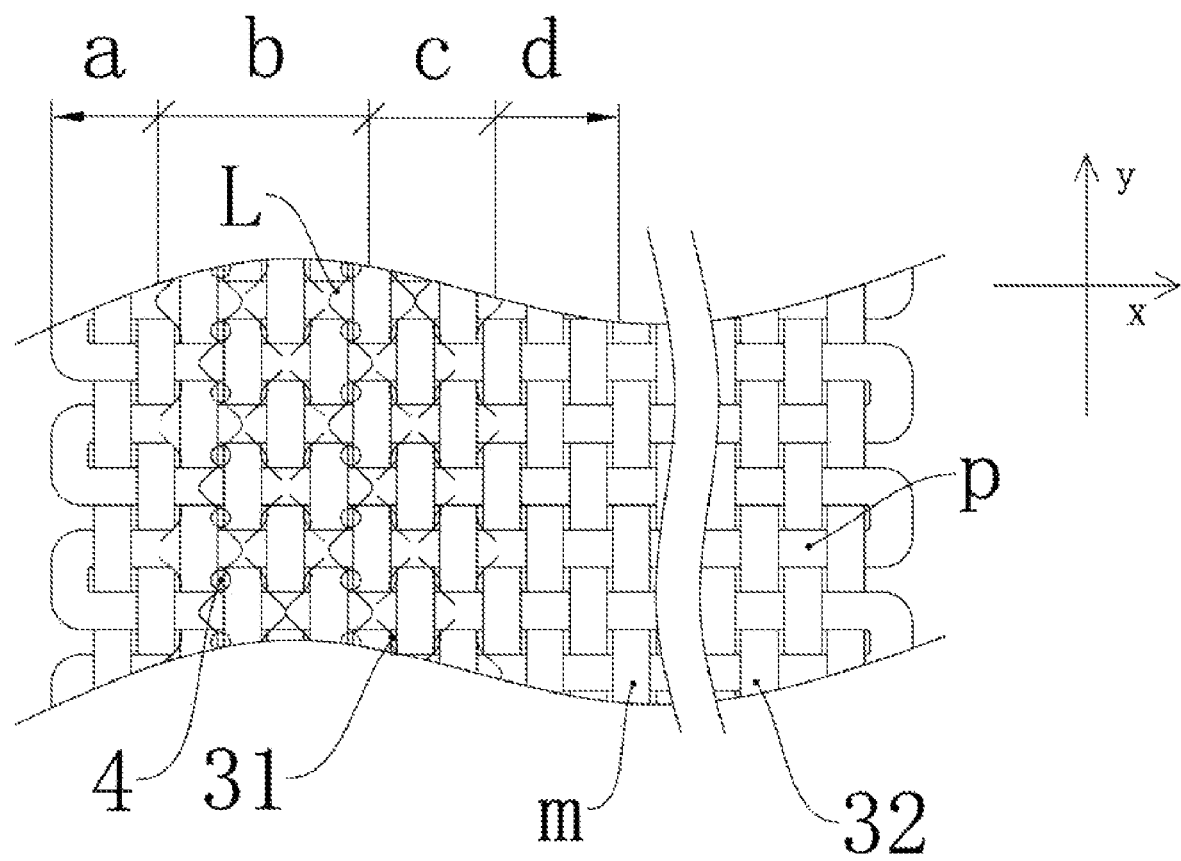
FIG. 5 is a structural diagram of a fabric tape according to a technical solution of the present disclosure.

As shown in FIG. 5, the fabric tape 3 extends in the longitudinal direction (Y) and includes warp yarns m and weft yarns p interwoven in longitudinal and transverse directions (X-Y), which are made from a high-melting fiber filament material. The warp yarns m are yarns extending in the longitudinal direction (Y) in the fabric tape 3, and the weft yarns p are yarns extending in a direction (X) substantially perpendicular to the warp yarns m. The warp yarns and the weft yarns are intertwined to form the fabric tape of a single layer. In specific applications, two-layer or three-layer fabric tapes may also be formed. A pocket-shaped space may be provided in the multi-layer fabric tape. The pocket-shaped space extends in the longitudinal direction. In the present disclosure, the warp yarns m, the weft yarns p, the fastener teeth 22, and the sewing thread 23 are made from high-melting polyester, which has a melting temperature of generally about 260° C. and a heat-setting temperature of generally 110° C.-170° C.

As shown in FIGS. 1 to 4, a cross-section view of the fabric tape 3 shows that the fabric tape 3 includes two large regions, namely, an inner connecting portion 31 and an outer connecting portion 32 that are interconnected by the weft yarns p. The inner connecting portion 31 is bent relative to the outer connecting portion 32, and the two are connected by a bend transition portion d. After the fabric tape 3 is bent, an open stable gap 30 is formed between the inner connecting portion 31 and the outer connecting portion 32. The inner connecting portion 31, the outer connecting portion 32, and the bend transition portion d are connected by the weft yarns p. The inner connecting portion 31 is configured to mount the fastener teeth 22, and the outer connecting portion 32 is used for connecting one of the two sides of the sewing portion 11 of the fabric 1. The fastener teeth 22 are connected to the back side of the inner connecting portion 31 by the sewing thread 23. The outer connecting portions 32 of the two fabric tapes 3 are sewn to the back side of the fabric 1 through connecting threads 12 and are located on the two sides of the sewing portion 11. The slider 21 is bound with two rows of the fastener teeth 22 and is configured to engage or separate the two rows of the fastener teeth 22 to link or open the sewing portion 11 of the fabric 1. When the fastener teeth 22 are sewn on an inner side of the inner connecting portion 31, and the outer connecting portion 32 and the inner connecting portion 31 have relative bending arrangement angles, the concealed slide fastener 2 is formed. Generally, the fastener teeth 22 are first sewn through the sewing thread 23, and then the bending process is performed. The bent structure is generally formed when the slide fastener 2 is pre-shaped by heating.

As shown in FIG. 5, the fabric tape 3 is sequentially provided with the inner connecting portion 31, the bend transition portion d, and the outer connecting portion 32 along the X direction. The inner connecting portion 31 includes an outer over-locking region a, an teeth sewing region b extending to the right starting from the over-locking region a, and an inner extension portion C extending inward starting from the teeth sewing region b (toward the bend transition portion d). The bend transition portion d and the outer connecting portion 32 located outside the bend transition portion d are formed by starting and extending from the inner extension portion C to the right. The sewing thread 23 connects the fastener teeth 22 and the inner connecting portion 31 by passing through the teeth sewing region b.

The sewing thread 23 connects the fastener teeth 22 to the inner connecting portion 31 using a sewing machine. The inner connecting portion 31 provides the teeth sewing region b bound with the sewing thread 23. When the sewing thread 23 passes through the teeth sewing region b, two rows of penetration sites 4 are formed in the teeth sewing region b.

The sewing thread 23 is passed through each of the penetration sites 4. Through the penetration sites 4, the warp yarns and the weft yarns in the teeth sewing region b achieve the encircling and temporary positioning of the sewing thread 23 (the final positioning is only achieved after a low-melting component L mentioned later is welded). To this end, the teeth sewing region b includes at least the penetration sites 4 surrounding the sewing thread 23.

The fastener tape of the slide fastener includes at least the low-melting component L and high-melting components which have a melting temperature higher than that of the low-melting component L. The low-melting component L and the high-melting components are made from two materials with different melting temperatures. The present disclosure fabricates the slide fastener through the melting temperature difference. The fastener teeth 22, the sewing thread 23, the warp yarns m, and the weft yarns p all are high-melting components. In this embodiment, the high melting point and the low melting point are provided only as a relative definition for the purpose of exemplary and differentiated illustration.

As shown in FIG. 5, in the inner connecting portion 31, the low-melting component L is provided in the teeth sewing region b or even the inner extension portion c. Before the low-melting component L is thermally welded to fix the sewing thread 23, the warp yarns m and the weft yarns p, the warp yarns m do not have the ability to resist a large pulling force in the X direction, so they are easily pulled and displaced by the sewing thread 23. But after being melted, the low-melting component L connects and fixes the sewing thread 23, the warp yarns m, and the weft yarns p by thermal welding, such that the teeth sewing region b and the inner extension C are formed into a hardened structure. The hardened structure extends inward starting from the teeth sewing region b to a junction $d_0$ between the inner connecting portion 31 and the bend transition portion d. Due to the hardened structure, the warp yarns m in the teeth sewing region b and even the inner extension portion C have the ability to resist the large pulling force in the X direction, that is, in a left-right direction, such that cracks do not easily occur. In addition, the sewing thread 23 is fixed in the hardened structure and is not easily slipped. That is, after the hardened structure is formed by thermal welding, the sewing thread 23 shown in FIG. 5 does not easily slip at the penetration sites 4.

The thermal welding includes two meanings. The first meaning is that the low-melting component L is melted partially or completely when heated and forms a lump after cooling. The second meaning is that after being melted, the low-melting component L will weld the surrounding unmelted high-melting warp yarns m, weft yarns p, and sewing thread 23. When melted, the low-melting component L can be completely or partially melted, for example, its core can be controlled not to melt. The specific melting degree is related to the number of the low-melting component L and the hardness to be achieved, as well as the diameter of the warp yarn and the thickness of the inner connecting portion 31. At least the heating temperature should be controlled within a temperature range that prevents the low-melting component L from melting and flowing out of the inner connecting portion 31. When the temperature is lowered, the melted low-melting component L becomes hard, and the sewing thread 23, the warp yarns m, and the weft yarns p are fixedly connected by the low-melting component L to form the hardened structure together. In this way, the warp yarns will not be displaced when they are pulled by the pulling force in the X direction, namely, in the left-right direction, and the sewing thread 23 is fixed in the hardened structure and will not be moved, thereby making the fastener teeth 22 hard to move.

The low-melting component L is made from a material with a relatively low melting temperature and can be lumped after being melted. Of course, in actual slide fastener processing, for a slide fastener requiring dyeing, the melting temperature of the low-melting component L should be higher than the dyeing temperature. In addition, the melting temperature should also be higher than the daily ambient temperature and the safe use temperature specified by relevant standards. Generally, based on the melting temperatures of various polymer materials in the prior art, the low-melting component L in this embodiment includes polyethylene (PE), polypropylene (PP), or polylaurylamide (PA12) with a melting temperature of 150° C.-180° C. The melting temperature difference between the low-melting component L and other high-melting components in the fabric tape 3 is about 50° C.-90° C. In this way, when the low-melting component L is melted, the warp yarns m, the weft yarns p, the sewing thread 23, and the fastener teeth 22 with high melting point will not be melted and deformed.

In the above structural design, the region to provide the low-melting component L may extend to the outer over-locking region a of the inner connecting portion 31.

According to the above technical solution, the low-melting component L is fixedly connected to the sewing thread 23, the warp yarns m, and the weft yarns p by thermal welding to form the hardened structure at least in the teeth sewing region b. Compared with the prior art, the design of the present disclosure only requires setting the low-melting component L on the basis of the traditional warp and weft interweaving process, and melting and lumping the low-melting component L by heating. The process is simple and the lump structure is stable and reliable. In addition, the hardened structure enables the warp yarns m in the teeth sewing region b to have the ability to resist the pulling force in the left-right direction. The hardened structure can reduce the left-right movement of the sewing thread 23 relative to the teeth sewing region b when the fabric tape 3 is pulled in the left-right direction to reduce the gap between the two fabric tapes 3 viewed from the front after the left and right fastener teeth are engaged. The heating process of forming the hardened structure in the teeth sewing region b and the final heat-setting process of the fabric tape 3 can be combined into one to realize the heat-setting of the hardened structure.

In a further technical solution, a thickness W1 of the inner connecting portion 31 is greater than a thickness W2 of the outer connecting portion 32 to enhance the stiffness of the inner connecting portion 31, especially the hardened structure.

In this embodiment, the shape of the low-melting component L may vary according to how the low-melting component L is provided on the fabric tape 3 and may be in a granular shape, a short fiber shape, a long fiber shape, etc. In a further technical solution, the low-melting component L is a long strip, which is made from a low-melting material and is in the shape of yarn, a long wire or a long sheet. The low-melting component L may also be a long strip, which is made by mixing a low-melting material with a high-melting material and is in the shape of yarn, a long wire, or a long sheet. The low-melting component L may also be in the shape of a strip of fabric made of the long strip. That is, the long strip may be a yarn made from a filament by a spinning process or may be a slender rod with a diameter of 1 mm or less or a long flake with a thickness of less than 1 mm formed by an extrusion process. The long strip may be made from a low-melting material or may be made by adding a low-melting material to a high-melting material.

Figure 2:
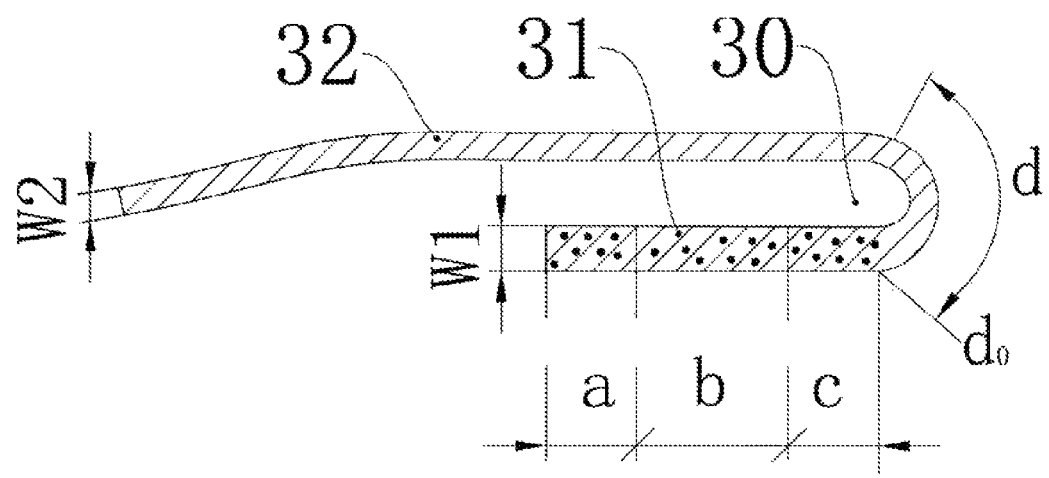
FIG. 2 is a first structural diagram of a fastener tape according to a technical solution of the present disclosure.

The low-melting component L is formed on the fabric tape 3 through a hybrid woven structure, an internal insertion structure, and an up-down connection structure. Specifically: The first type is the hybrid woven structure. As shown in FIG. 2, the warp yarns m located in the teeth sewing region b and the inner extension portion C are partially made from a low-melting long strip. As a part of a collection of all the warp yarns, the long strip is interwoven with the weft yarns p, and the fabric layer including the low-melting component L is directly formed in the teeth sewing region b. When the fabric layer including the low-melting component L is heated, only the low-melting component L is melted, and other parts are not melted but are welded together with the low-melting component L.

Figure 3:
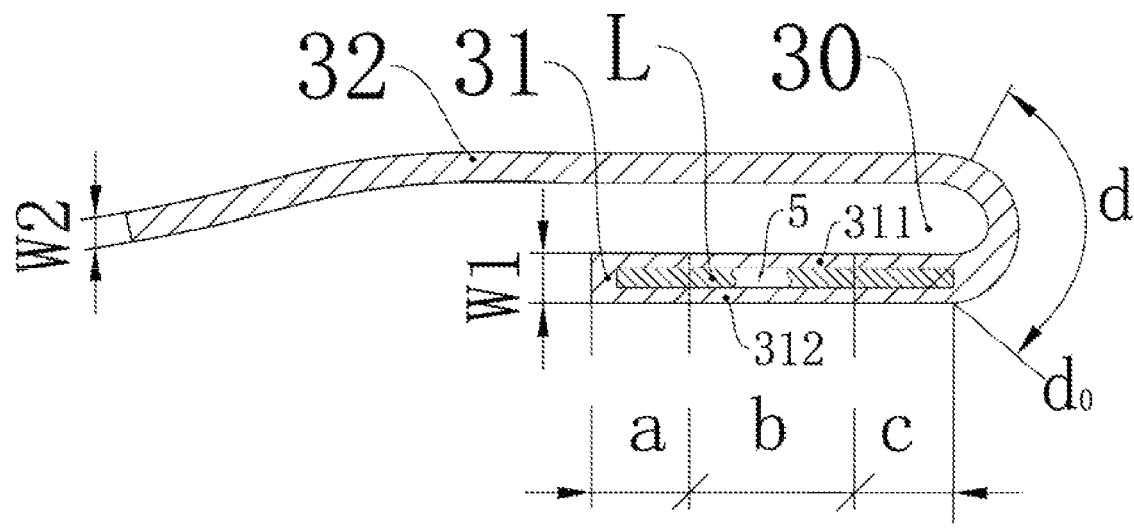
FIG. 3 is a second structural diagram of the fastener tape according to a technical solution of the present disclosure.

The second type is the internal insertion structure. As shown in FIG. 3, the inner connecting portion 31 has two layers of fabric tapes 3, namely, a first fabric layer 311 and a second fabric layer 312. Each layer of tape is interwoven by the warp yarns m and the weft yarns p. A pocket-shaped space 5 extending in the longitudinal direction is constructed between the first fabric layer 311 and the second fabric layer 312. When the pocket-shaped space 5 is formed, the low-melting component L is provided in the pocket-shaped space 5. After the low-melting component L thermally welds the first fabric layer 311 and the second fabric layer 312, the hardened structure is formed. The first fabric layer 311 and the second fabric layer 312 are arranged on the upper and lower sides of the hardened structure and cannot move relative to each other. In this embodiment, the pocket-shaped space 5 extends from the teeth sewing region b to two sides to the outer over-locking region and the inner extension portion C. In another embodiment, if the fastener tape is applied to a garment with a low tensile force, the pocket-shaped space 5 and the low-melting component L may be provided only in the teeth sewing region b. The low-melting component L provided in the pocket-shaped space 5 may be in a granular shape, a short fiber shape, a long fiber shape, a long strip shape, or a strip of fabric (woven from the long strip). The strip of fabric may be an independent piece woven from the long strip as a warp yarn and a weft yarn, or an independent piece woven from the long strip as a warp yarn and a high-melting weft yarn. When the fabric tape is woven, the strip of fabric is provided in the pocket-shaped space 5. Before the strip of fabric is melted, the strip of fabric is in a soft state.

In this embodiment, the two solutions may be combined, that is, the long strip, as a part of the collection of all the warp yarns, is directly woven with the weft yarn p, and the pocket-shaped space 5 is constructed at least in the teeth sewing region b and is provided therein with the low-melting component L.

Figure 4:
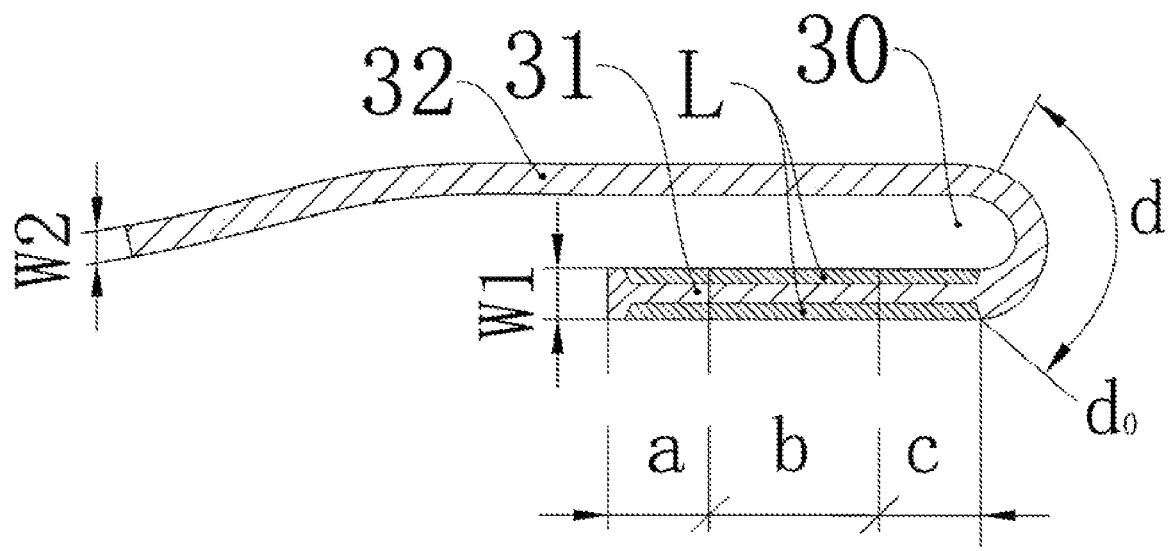
FIG. 4 is a third structural diagram of a fastener tape according to a technical solution of the present disclosure.

The third type is the up-down connection structure. As shown in FIG. 4, the low-melting component L or the strip of fabric woven with the low-melting component L is provided on an upper outer side and/or a lower outer side of the inner connecting portion 31. The low-melting component L is pre-mounted on the outer side of the inner connecting portion 31 by means of bonding or seaming, etc. The low-melting component L extends from the teeth sewing region b to two sides to the outer over-locking region and the inner side extension portion C, and the fastener teeth 22 are sewn through the sewing thread 23. When the low-melting component L is melted, the surrounding sewing thread 23, weft yarns p, and warp yarns m are welded. In an equivalent embodiment, the low-melting component L or the strip of fabric woven with the low-melting component L may also be provided only on one side of the inner connecting portion 31. The specific design method should meet the purpose of the present disclosure.

The present disclosure further proposes a method of forming the fastener tape. The fastener tape includes the fabric tape 3. The fabric tape 3 is provided with high-melting warp yarns m and weft yarns p. The warp yarns m and the weft yarns p are interwoven in the longitudinal and transverse directions. A cross-sectional view shows that the fabric tape 3 includes the outer connecting portion 32 and the inner connecting portion 31, which are arranged left and right in the transverse direction, and are connected by the weft yarns p. The fastener tape further includes the high-melting fastener teeth 22 and sewing thread 23. The fastener teeth 22 are sewn to one side of the inner connecting portion 31 through the sewing thread 23. The outer connecting portion 32 is used for connecting a fabric. The inner connecting portion 31 includes the teeth sewing region b bound with the sewing thread 23. A low-melting component L is further provided in at least the teeth sewing region b of the inner connecting portion 31. The melting temperature of the low-melting component L is lower than the melting temperature of the fastener teeth 22, the sewing thread 23, the weft yarns P, and the warp yarns m. The melting temperature difference between the low-melting component L and the sewing thread 23, the weft yarns p, and the warp yarns m made from high-melting materials in the fabric tape 3 is at least about 50° C.-90° C., such as 50° C., 70° C., 90° C., 100° C., 110° C. After the warp yarns m and the weft yarns p of the fabric tape 3 are interwoven and the low-melting component L is formed, the fastener teeth 22 are sewn through the sewing thread 23. Further, the inner connecting portion 31 is heated at a heating temperature adapted to the melting temperature of the low-melting component L, such that the low-melting component L is melted into a lump. At this time, the high-melting sewing thread 23, warp yarns m, weft yarns p, and fastener teeth 22 are not melted. The low-melting component L is hardened after cooling and thermally welds the surrounding sewing thread 23, warp yarns m, and weft yarns p, such that the region where the low-melting component L is provided becomes a hardened structure. Compared with the prior art, in the present disclosure, when the fastener teeth 22 are sewn, the low-melting component L in the teeth sewing region b is still in an unwelded state. Therefore, the design of the present disclosure will not damage the sewing needle of the sewing machine and can avoid the problem that the sewing needle is bumped by impact.

Further, in the inner connecting portion 31, the outer seaming region and the inner extension portion C are also provided with a low-melting component L. After the low-melting component L is melted, the entire inner connecting portion 31 is turned into a hardened structure.

The low-melting component L is partially added into the collection of all the warp yarns forming the inner connecting portion 31. The low-melting component adopts low-temperature warp yarns m made from a low-melting material, such as the long strip. That is, in the inner connecting portion 31, at least part of the warp yarns m and the weft yarns p are high-melting components, and the low-temperature warp yarns m made from a low-melting material are added into the high-melting warp yarns m. The low-temperature warp yarns m can be pure low-melting fiber yarns, or warp yarns m including a low-melting material, that is, a mixed thread or a blended thread. These warp yarns m including the low-melting material can also form the hardened structure.

The hardening of the low-melting component L is a characteristic that occurs when the low-melting component L is melted and then cooled. The embodiment of the present disclosure cleverly utilizes this characteristic to realize the thermal welding of the sewing thread 23, the warp yarns m, and the weft yarns p by the low-melting component L, thereby obtaining the hardened structure.

In a further technical solution, the diameter of the warp yarns m of the inner connecting portion 31 is increased or the number of interwoven layers of the warp yarns m and the weft yarns p of the inner connecting portion 31 is increased, such that the thickness of the inner connecting portion 31 is greater than the thickness of the outer connecting portion 32.

In a further technical solution, after the fastener teeth 22 are sewn to the fabric tape 3, the fabric tape 3 is bent along the side of the fastener teeth 22 and pre-shaped by low-temperature heating to form the outer connecting portion 32 and the inner connecting portion 31 which have relative bending arrangement angles as well as the bend transition portion d that connects the outer connecting portion 32 and the inner connecting portion 31. Then, the inner connecting portion 31 is heated at a heating temperature adapted to the melting temperature of the low-melting component L to melt the low-melting component L.

After the slide fastener is cooled, the slider 21 is provided on the fastener teeth 22 of the two fabric tapes. The slider 21 is bound to the two rows of the fastener teeth 22 and is configured to engage or separate the two rows of the fastener teeth 22. The low-melting component L is melted on the basis of pre-bending the fabric tape 3, which facilitates the bending process and enables the hardened structure to be sufficiently close and extend to the bend transition portion d. As shown in FIG. 1, when viewed from the vertical direction, after the two rows of the fastener teeth 22 are engaged with each other, the top ends of the two bend transition portions d provided on the left and right abut against each other, and the gap is extremely small. Due to the hardened structure, even if the outer connecting portion 32 is pulled forcibly in the left-right direction, the warp yarns m and the sewing thread 23 in the inner connecting portion 31 are not easily deformed or moved, such that the small gap can be maintained between the top ends of the two bend transition portions d provided on the left and right. The heating temperature is generally controlled at about 110° C.-130° C., which can preliminarily realize the bending and deformation of the fabric tape 3 and can perform the first heat-setting on the fabric tape 3. The purpose of heat-setting is to eliminate the internal stress of the warp yarns m and the weft yarns p, such that the fabric tape 3 remains stable after it is made. The process of melting the low-melting component L and the process of finally heat-setting the fabric tape 3 are combined into one to reduce energy consumption and realize the heat-setting of the hardened structure. In the subsequent process of melting the low-melting component L, the fabric tape 3 may also be subjected to second heat-setting.

For a slide fastener that needs dyeing, the dyeing temperature is controlled to be lower than the temperature at which the low-melting component L is melted. Further, it is preferable to arrange the dyeing process after the melting process of the low-melting component L and the final heat-setting process.

What is claimed is:

1. A fastener tape comprising two fabric tapes, which extend in a longitudinal direction, and are made by interweaving high-melting warp yarns and weft yarns in longitudinal and transverse directions, wherein a cross-sectional view shows that the fabric tapes each comprise an outer connecting portion and an inner connecting portion, which are arranged left and right in the transverse direction and are connected by the weft yarns; the fastener tape further comprises high-melting fastener teeth and sewing thread; wherein the fastener teeth are sewn to an outer side of the inner connecting portion through the sewing thread; the outer connecting portion is used for connecting a fabric; the inner connecting portion comprises a teeth sewing region bound with the sewing thread; a low-melting component is provided in at least the teeth sewing region of the inner connecting portion; and the low-melting component thermally welds the sewing thread, the warp yarns, and the weft yarns, such that at least the teeth sewing region is formed into a hardened structure.

2. The fastener tape according to claim 1, wherein the outer connecting portion and the inner connecting portion are connected through a bend transition portion; and the hardened structure starts and extends from the teeth sewing region to a junction between the inner connecting portion and the bend transition portion.

3. The fastener tape according to claim 2, wherein two layers of fabric tapes are at least provided in the teeth sewing region; a pocket-shaped space extending in the longitudinal direction is constructed between the two layers of fabric tapes; and the low-melting component is provided in the pocket-shaped space to thermally weld the two layers of fabric tapes.

4. The fastener tape according to claim 2, wherein the low-melting component is provided on the outer side of the inner connecting portion.

5. The fastener tape according to claim 1, wherein the low-melting component is a long strip, which is made from a low-melting material and is in a shape of a yarn, a long wire, or a long sheet; and alternatively, the low-melting component is a long strip, which is made by mixing a low-melting material with a high-melting material and is in a shape of a yarn, a long wire, or a long sheet.

6. The fastener tape according to claim 5, wherein the low-melting component is a strip of fabric made of the long strip.

7. The fastener tape according to claim 6, wherein two layers of fabric tapes are at least provided in the teeth sewing region; a pocket-shaped space extending in the longitudinal direction is constructed between the two layers of fabric tapes; and the low-melting component is provided in the pocket-shaped space to thermally weld the two layers of fabric tapes.

8. The fastener tape according to claim 6, wherein the low-melting component is provided on the outer side of the inner connecting portion.

9. The fastener tape according to claim 5, wherein two layers of fabric tapes are at least provided in the teeth sewing region; a pocket-shaped space extending in the longitudinal direction is constructed between the two layers of fabric tapes; and the low-melting component is provided in the pocket-shaped space to thermally weld the two layers of fabric tapes.

10. The fastener tape according to claim 5, wherein the low-melting component is provided on the outer side of the inner connecting portion.

11. The fastener tape according to claim 1, wherein two layers of fabric tapes are at least provided in the teeth sewing region; a pocket-shaped space extending in the longitudinal direction is constructed between the two layers of fabric tapes; and the low-melting component is provided in the pocket-shaped space to thermally weld the two layers of fabric tapes.

12. The fastener tape according to claim 1, wherein the low-melting component is provided on the outer side of the inner connecting portion.

13. A slide fastener comprising a fastener tape, wherein the fastener tape comprises two fabric tapes, which extend in a longitudinal direction, and are made by interweaving high-melting warp yarns and weft yarns in longitudinal and transverse directions, wherein a cross-sectional view shows that the fabric tapes each comprise an outer connecting portion and an inner connecting portion, which are arranged left and right in the transverse direction and are connected by the weft yarns; the fastener tape further comprises high-melting fastener teeth and sewing thread; wherein the fastener teeth are sewn to an outer side of the inner connecting portion through the sewing thread; the outer connecting portion is used for connecting a fabric; the inner connecting portion comprises a teeth sewing region bound with the sewing thread; a low-melting component is provided in at least the teeth sewing region of the inner connecting portion; and the low-melting component thermally welds the sewing thread, the warp yarns, and the weft yarns, such that at least the teeth sewing region is formed into a hardened structure; and the slide fastener further comprises a slider, wherein the slider is bound with the fastener teeth provided on the two fabric tapes of the fastener tape, and the slider is configured to engage or separate two rows of the fastener teeth.

14. A skin product comprising an outer layer made of a fabric, wherein the fabric is provided with a sewing portion shaped as an opening; the outer connecting portions of the two fabric tapes of the slide fastener according to claim 13 are attached to two sides of the sewing portion, respectively, to link or open the sewing portion of the fabric by engaging or separating the fastener teeth; and the fabric is made of textile, genuine leather or artificial leather.

15. A method of forming a fastener tape comprising: forming two fabric tapes, which extend in a longitudinal direction, and are made by interweaving high-melting warp yarns and weft yarns in longitudinal and transverse directions, wherein a cross-sectional view shows that the fabric tapes each comprise an outer connecting portion and an inner connecting portion, which are arranged left and right in the transverse direction and are connected by the weft yarns; the method further comprises forming high-melting fastener teeth and sewing thread; wherein the fastener teeth are sewn to an outer side of the inner connecting portion through the sewing thread; the outer connecting portion is used for connecting a fabric; the inner connecting portion comprises a teeth sewing region bound with the sewing thread; a low-melting component is provided in at least the teeth sewing region of the inner connecting portion; a melting temperature of the low-melting component is lower than a melting temperature of the fastener teeth, the sewing thread, the weft yarns, and the warp yarns; after the warp yarns and the weft yarns of the fabric tapes are interwoven and the low-melting component is arranged, the fastener teeth are sewn through the sewing thread; heating the inner connecting portion at a heating temperature adapted to the melting temperature of the low-melting component, such that the low-melting component is melted while the high-melting sewing thread, warp yarns, weft yarns, and fastener teeth are not melted; and cooling the low-melting component, such that the low-melting component is hardened and thermally welds the surrounding sewing thread, warp yarns, and weft yarns, thereby turning a region where the low-melting component is provided into a hardened structure.

16. The method of forming the fastener tape according to claim 15, wherein a difference between the melting temperature of the low-melting component and the melting temperature of the sewing thread, weft yarns, and warp yarns made from a high-melting material in the fabric tapes is 50° C.-90° C.

17. The method of forming the fastener tape according to claim 16, wherein the method further comprises: bending the fabric tapes along a side of the fastener teeth and pre-shaping by low-temperature heating, after the fastener teeth are sewn to the fabric tapes, to form the inner connecting portion, the outer connecting portion that is bent relative to the inner connecting portion, and a bend transition portion that connects the outer connecting portion and the inner connecting portion; and heating the inner connecting portion at the heating temperature adapted to the melting temperature of the low-melting component to melt the low-melting component.

18. The method of forming the fastener tape according to claim 15, wherein the low-melting component is partially added into a collection of all the warp yarns forming the inner connecting portion.

19. The method of forming the fastener tape according to claim 18, wherein the method further comprises: bending the fabric tapes along a side of the fastener teeth and pre-shaping by low-temperature heating, after the fastener teeth are sewn to the fabric tapes, to form the inner connecting portion, the outer connecting portion that is bent relative to the inner connecting portion, and a bend transition portion that connects the outer connecting portion and the inner connecting portion; and heating the inner connecting portion at the heating temperature adapted to the melting temperature of the low-melting component to melt the low-melting component.

20. The method of forming the fastener tape according to claim 15, wherein the method further comprises: bending the fabric tapes along a side of the fastener teeth and pre-shaping by low-temperature heating, after the fastener teeth are sewn to the fabric tapes, to form the inner connecting portion, the outer connecting portion that is bent relative to the inner connecting portion, and a bend transition portion that connects the outer connecting portion and the inner connecting portion; and heating the inner connecting portion at the heating temperature adapted to the melting temperature of the low-melting component to melt the low-melting component.

\* \* \* \* \*